United States Patent
Wang et al.

(10) Patent No.: US 10,921,129 B2
(45) Date of Patent: Feb. 16, 2021

(54) DISTRIBUTED INDOOR POSITIONING SYSTEM AND METHOD THEREOF

(71) Applicant: OSENSE TECHNOLOGY CO., LTD., Taipei (TW)

(72) Inventors: You-Kwang Wang, Taipei (TW); Hung-Ya Tsai, Taipei (TW)

(73) Assignee: OSENSE TECHNOLOGY CO., LTD., Taipei (TW)

( * ) Notice: Subject to any disclaimer, the term of this patent is extended or adjusted under 35 U.S.C. 154(b) by 163 days.

(21) Appl. No.: 16/260,359

(22) Filed: Jan. 29, 2019

(65) Prior Publication Data
US 2019/0234744 A1   Aug. 1, 2019

Related U.S. Application Data

(60) Provisional application No. 62/623,048, filed on Jan. 29, 2018.

(51) Int. Cl.
| | | |
|---|---|---|
| *G01C 21/20* | (2006.01) | |
| *G06K 9/00* | (2006.01) | |
| *H04W 4/024* | (2018.01) | |
| *G01S 5/00* | (2006.01) | |
| *H04W 4/33* | (2018.01) | |
| *H04W 4/02* | (2018.01) | |

(52) U.S. Cl.
CPC ............ *G01C 21/206* (2013.01); *G01S 5/00* (2013.01); *G06K 9/00664* (2013.01); *H04W 4/024* (2018.02); *H04W 4/02* (2013.01); *H04W 4/33* (2018.02)

(58) Field of Classification Search
CPC ........... G01C 21/206; G01S 5/00; G01S 5/16; G06K 9/00664; G06K 9/6232; H04W 4/024; H04W 4/33; H04W 4/02
See application file for complete search history.

(56) References Cited

U.S. PATENT DOCUMENTS

| | | | | |
|---|---|---|---|---|
| 6,222,583 | B1 * | 4/2001 | Matsumura | G01C 21/3635 345/619 |
| 9,672,588 | B1 * | 6/2017 | Doucette | G06T 3/40 |
| 10,326,934 | B2 * | 6/2019 | Mitsui | H04N 5/23238 |
| 2006/0285754 | A1 * | 12/2006 | Steinberg | G06K 9/00684 382/224 |

(Continued)

FOREIGN PATENT DOCUMENTS

WO    2015/132914    9/2015

OTHER PUBLICATIONS

Japanese Office Action for Japanese Patent Application No. 2019-012246 dated Feb. 27, 2020.

*Primary Examiner* — Mary Cheung
(74) *Attorney, Agent, or Firm* — Amin, Turocy & Watson, LLP

(57) ABSTRACT

A distributed indoor positioning system and a method thereof are disclosed. In the method, indoor map data corresponding to a place where a user is located is loaded first, and an indoor image of the place where the user is located is captured to generate an image stream. Next, the image stream is compressed to reduce dimensionality thereof, so as to generate a dimensionality-reduced image. The indoor map data corresponding to the dimensionality-reduced image is obtained from the loaded indoor map data, and a position of the user is determined according to the obtained indoor map data.

10 Claims, 5 Drawing Sheets

(56) References Cited

U.S. PATENT DOCUMENTS

| | | | |
|---|---|---|---|
| 2015/0051835 A1* | 2/2015 | Jung | G06F 3/0421 |
| | | | 701/533 |
| 2015/0262120 A1* | 9/2015 | Kulig | G06Q 10/087 |
| | | | 705/28 |
| 2015/0324646 A1 | 11/2015 | Kimia | |
| 2016/0165136 A1* | 6/2016 | Mitsui | H04N 5/23238 |
| | | | 348/36 |

* cited by examiner

DISTRIBUTED INDOOR POSITIONING SYSTEM AND METHOD THEREOF

BACKGROUND

1. Technical Field

The present disclosure relates to positioning techniques, and more particularly to a distributed indoor positioning system and a method thereof.

2. Description of the Related Art

With the rapid development of information technology, and various technological applications are integrated into people's lives to simplify many complicated procedures and make lives more convenient. Among the technological applications, location based services (LBS) have been widely used in life, and a key feature of the location based service is positioning. In the past, the positioning technology was used for military purposes; however, in recent years, the positioning technology is gradually used in navigation applications, push applications, or emergency disaster relief applications. Among many positioning technologies, the global positioning system (GPS) is more common.

In outdoors, the global positioning system can be used to determine a current location for further location-based service or emergency assistance, such as the service of finding nearby stores or parking lots. Since the global positioning system uses satellites and the triangulation positioning principle to determine a position of an object, the accuracy of the determined position is high. However, the global positioning system is easily affected by signal refraction or diffraction occurred in place where there are many high-rise buildings, or in an indoor space, thereby generating an indoor positioning result with great errors; obviously, the global position system does not work in indoor environment. For this reason, many companies use other technologies, such as infrared, ultrasonic, ZigBee, Wi-Fi, or Beacon technologies, for indoor positioning; however, there is still much room for improvement in the above technologies. For example, the aforementioned technologies usually map the user's movement result to pre-stored map data, but the size of the corresponding map data possibly reaches several GB or dozens GB when the indoor space is large. The user device needs to load the large quantity of map data for positioning, and it causes an excessive load or computation of the user device. Similarly, the large quantity of map data also increases burden of a map data integration server.

Therefore, how to develop an indoor positioning technology, in particular, how to reduce the computing loads of the user device and the map data integration server and also provide accurate positioning result when the amount of the indoor map data is huge, is a key issue for those skilled in the art.

SUMMARY

The present disclosure is to provide an indoor positioning technology, which can reduce a load computation of a user device or a map data integration system by reducing a recorded data amount of map data, thereby solving the conventional problem that the positioning speed is too slow because of the huge amount of map data.

The present disclosure provides a distributed indoor positioning system comprising a map data loading module, an image capturing module, an image dimensionality reduction module and a comparison module. The map data loading module is configured to load indoor map data corresponding to a place where a user is located. The image capturing module is configured to capture, through a camera of a user device, an indoor image corresponding to the place where the user is located, so as to generate an image stream. The image dimensionality reduction module is configured to compress the image stream, reduce dimensionality of the image stream, and generate a dimensionality-reduced image. The comparison module is configured to obtain, from the map data loading module, indoor map data corresponding to the dimensionality-reduced image, and determine a position of the user according to the corresponding indoor map data.

In an embodiment, the distributed indoor positioning system further includes an image temporary storage unit configured to temporarily store the image stream.

In an embodiment, the distributed indoor positioning system further includes a map data building module configured to execute a building mode to track movement of the user for defining coordinate data, and link the coordinate data with the dimensionality-reduced image corresponding thereto, so as to generate personal positioning map data.

In an embodiment, the personal positioning map data generated by the map data building module is uploaded to a map data integration server, and stored in a database of the map data integration server. In addition, the map data integration server receives and integrates the personal positioning map data transmitted by at least one user, so as to generate the indoor map data.

In an embodiment, the comparison module activates a navigation program or provides guide information after the position of the user is determined.

Moreover, the present disclosure provides a distributed indoor positioning method, comprising: loading indoor map data corresponding to a place where a user is located; capturing an indoor image of the place where the user is located to generate an image stream; compressing the image stream to reduce dimensionality of the image stream, so as to generate a dimensionality-reduced image; and obtaining, from the loaded indoor map data, indoor map data corresponding to the dimensionality-reduced image, and determining a position of the user according to the obtained indoor map data.

In an embodiment, the distributed indoor positioning method further includes, before the step of determining the position of the user, executing a building mode to track movement of the user for defining coordinate data and link the coordinate data with the dimensionality-reduced image corresponding thereto, so as to generate and upload personal positioning map data to a map data integration server. In addition, the map data integration server integrates the personal positioning map data transmitted by at least one user to generate the indoor map data.

In an embodiment, the distributed indoor positioning method further includes, after the position of the user is determined, activating a navigation program or providing guide information.

Compared with the conventional technology, the distributed indoor positioning system and the method of the present disclosure can execute the dimensionality reduction processing on the captured indoor images for building the map data, so that the final indoor map data file is not too large and does not cause a storage problem when being downloaded to a user device. Furthermore, the dimensionality reduction process is also performed on the captured indoor image when determining the position of the user. As a result, the positioning determination in the user device can be accelerated when the sizes of the built map data and the indoor image are reduced. Therefore, the distributed indoor positioning system and method of the present disclosure using the dimensionality reduction technique can provide the positioning result with high accuracy, accelerate the speed of positioning determination, and also reduce the computing load of the user device and the map data integration server.

BRIEF DESCRIPTION OF THE DRAWINGS

The structure, operating principle and effects of the present disclosure will be described in detail by way of various embodiments which are illustrated in the accompanying drawings.

DETAILED DESCRIPTION OF THE EMBODIMENTS

Figure 1:
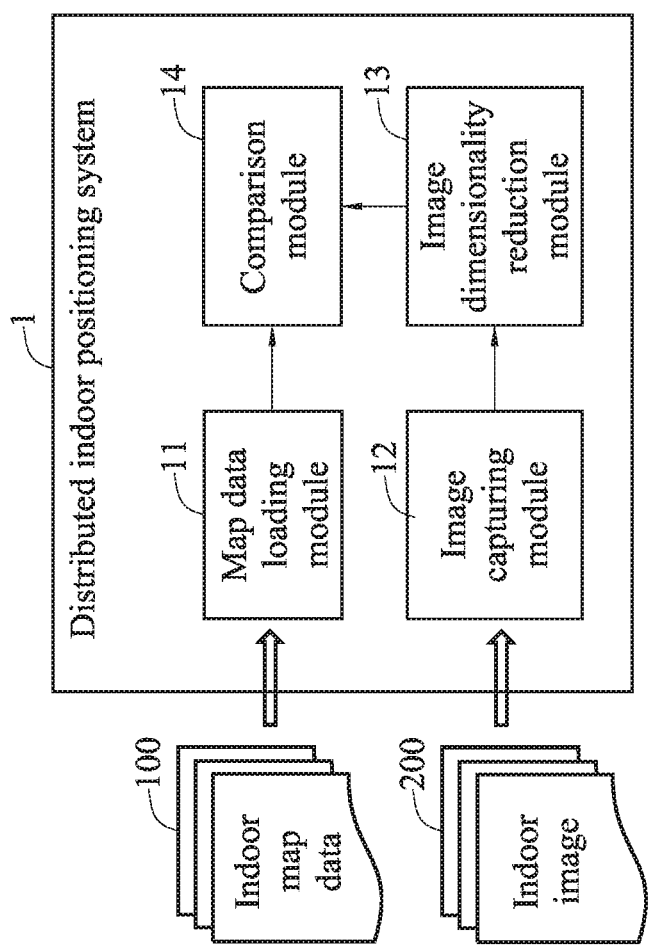
FIG. 1 is a system architecture diagram of a distributed indoor positioning system of the present disclosure.

The following embodiments of the present disclosure are herein described in detail with reference to the accompanying drawings. These drawings show specific examples of the embodiments of the present disclosure. It is to be acknowledged that these embodiments are exemplary implementations and are not to be construed as limiting the scope of the present disclosure in any way. Further modifications to the disclosed embodiments, as well as other embodiments, are also included within the scope of the appended claims. These embodiments are provided so that this disclosure is thorough and complete, and fully conveys the inventive concept to those skilled in the art. Regarding the drawings, the relative proportions and ratios of elements in the drawings may be exaggerated or diminished in size for the sake of clarity and convenience. Such arbitrary proportions are only illustrative and not limiting in any way. The same reference numbers are used in the drawings and description to refer to the same or like parts.

It is to be acknowledged that although the terms 'first', 'second', 'third', and so on, may be used herein to describe various elements, these elements should not be limited by these terms. These terms are used only for the purpose of distinguishing one component from another component. Thus, a first element discussed herein could be termed a second element without altering the description of the present disclosure. As used herein, the term "or" includes any and all combinations of one or more of the associated listed items.

It will be acknowledged that when an element or layer is referred to as being "on," "connected to" or "coupled to" another element or layer, it can be directly on, connected or coupled to the other element or layer, or intervening elements or layers may be present. In contrast, when an element is referred to as being "directly on," "directly connected to" or "directly coupled to" another element or layer, there are no intervening elements or layers present.

In addition, unless explicitly described to the contrary, the word "comprise" and variations such as "comprises" or "comprising", will be acknowledged to imply the inclusion of stated elements but not the exclusion of any other elements.

In the process of the indoor positioning determination according to a user's movement, when the indoor field is too large and the original image data record is selected for positioning, the excessive sizes of files possibly cause data loading problem of the user device, or the server performing positioning integration. Therefore, the present disclosure proposes to perform image dimensionality reduction on the captured image and distribute the computational load to every user device, thereby solving the conventional problem.

Please refer to FIG. 1, which is a system architecture diagram of a distributed indoor positioning system of the present disclosure. The distributed indoor positioning system 1 of the present disclosure is executed in a user device, and the user device can be a mobile device, such as a mobile phone or a tablet. A built-in camera of the user device can be used to capture an indoor image, and after the indoor image is analyzed and compared with pre-stored map data, an indoor position of the user can be accurately determined. As shown in FIG. 1, the distributed indoor positioning system 1 of the present disclosure includes a map data loading module 11, an image capturing module 12, an image dimensionality reduction module 13 and a comparison module 14.

The map data loading module 11 can load indoor map data 100 corresponding to the place where the user is located. Simply speaking, in order to determine the position of the user, the map data loading module 11 can first load the indoor map data 100 of the place where the user is located; for example, the map data loading module 11 can load the indoor map data 100 through the user device from network, such as from a server performing the positioning integration. In a condition that the size of the map data is not adjusted, it possibly causes insufficient storage space and excessive computational load of the user device. For example, when the user is located on the B floor of a building A, the map data of the B floor must be loaded first into the user device, so the map data must be built in advance. The operation of building the map data is described in following paragraphs.

The image capturing module 12 can capture, through a camera of the user device, an indoor image 200 of the place where the user is located, so as to generate an image stream. The image capturing module 12 can be a camera or an image capture device connected to the user device, and used to capture the indoor image 200 of the place where user is located. The indoor image 200 is processed to form the image stream; in other words, the user can hold the user device to capture the indoor image 200, and the indoor image 200 will be used as a basis for positioning determination.

The image dimensionality reduction module 13 can perform compression on the image stream to reduce dimensionality of the image stream, so as to generate a dimensionality-reduced image. As mentioned above, when the generated map data is not compressed, the excessive size of the map data possibly causes the system to execute slowly. For this reason, the dimensionality reduction processing is performed on the obtained indoor map data 100 for building the map data. Before image comparison, the dimensionality reduction processing is also performed on the image stream of the captured indoor image 200, to compress the size of the image stream.

The comparison module 14 can obtain the indoor map data 100 corresponding to the dimensionality-reduced image, from the map data loading module 11 and then determine the position of the user according to the corresponding indoor map data 100. After the comparison module 14 receives the dimensionality-reduced image stream, the comparison module 14 can obtain the indoor map data 100 corresponding to the dimensionality-reduced image, from the map data loading module 11. When the dimensionality-reduced image matches the obtained indoor map data 100, the position of the user can be estimated. Specifically, the indoor map data 100 can be recorded with the coordinates of the indoor positions, so that the indoor position of the user can be determined according to the captured indoor image.

The map data loading module 11, the image capturing module 12, the image dimensionality reduction module 13 and the comparison module 14 can be implemented by software. The user can load distributed indoor positioning system 1 into the user device, and when the user wants to execute the indoor positioning, the user can activate the distributed indoor positioning system 1, and the modules of the distributed indoor positioning system 1 start to load execution data, capture image and perform subsequent analysis comparison, respectively. After the operation of the distributed indoor positioning system 1 is completed, a positioning result can be generated and displayed on a screen of the user device.

According to above-mentioned contents, the indoor map data 100 can be the pre-processed map data with a reduced file size, and the user can use the user device to capture the indoor image 200 of the place where the user is located. The image dimensionality reduction module 13 then performs the dimensionality reduction processing on the indoor image 200, and the indoor map data 100 corresponding to the dimensionality-reduced image can be obtained from the map data loading module 11. The position of the user can be obtained according to the corresponding indoor map data 100.

According to the present disclosure, since the dimensionalities of the loaded indoor map data 100 and the captured indoor image 200 are reduced, the file sizes of the indoor image 200 and the map data 100 can be reduced, so that the problem that the distributed indoor positioning system 1 in the user device executes too slowly because of the excessive computation can be prevented, and the computing load of the user device can be reduced, thereby facilitating the distributed indoor positioning system 1 to quickly estimate the position of the user.

Figure 2:
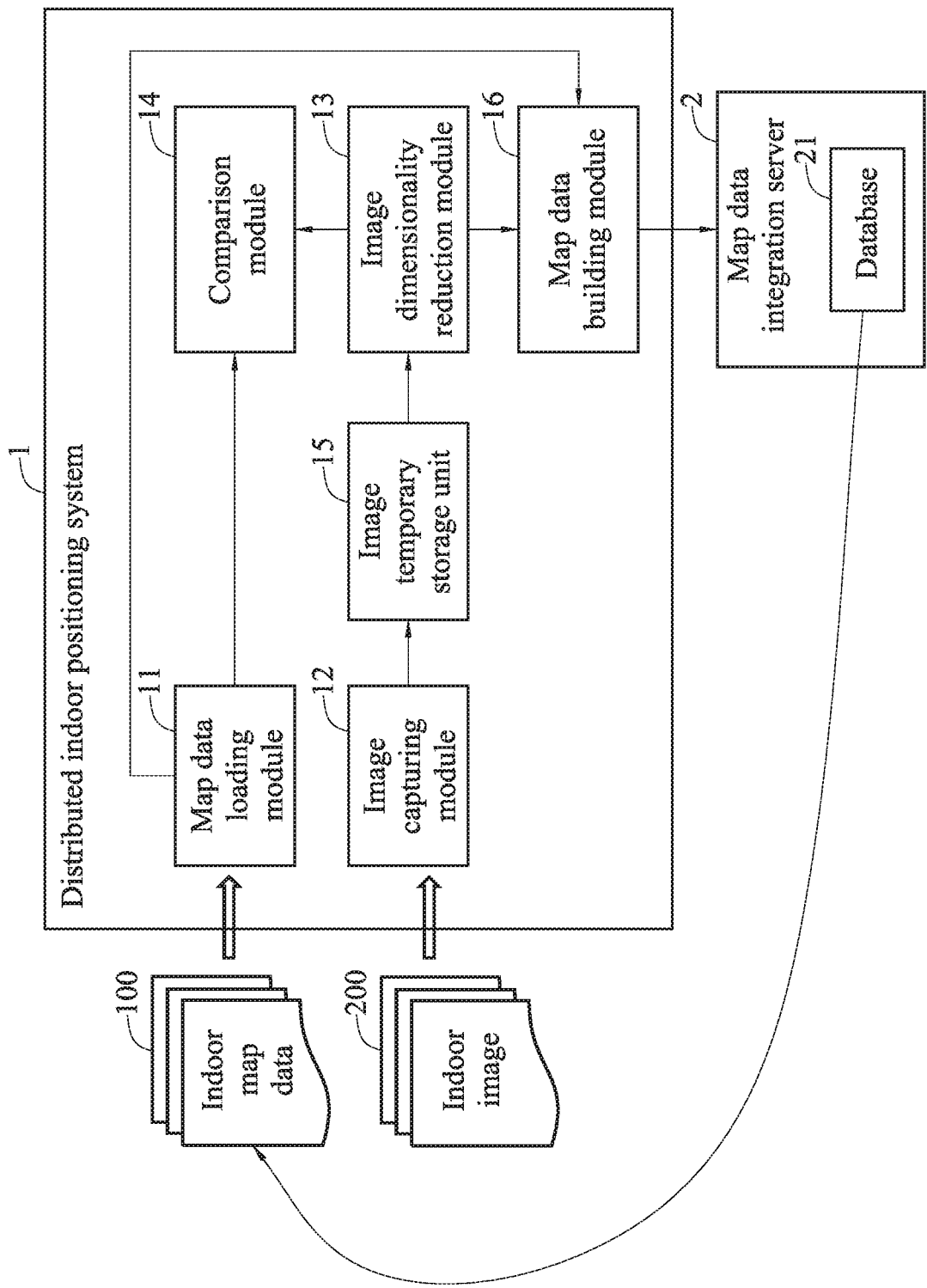
FIG. 2 is a system architecture diagram of another embodiment of a distributed indoor positioning system of the present disclosure.

Please refer to FIG. 2, which is a system architecture diagram of another embodiment of a distributed indoor positioning system of the present disclosure. As shown in FIG. 2, the map data loading module 11, the image capturing module 12, the image dimensionality reduction module 13 and the comparison module 14 of the distributed indoor positioning system 1 of this embodiment shown in FIG. 2 are the same as that of the embodiment shown in FIG. 1, so detailed descriptions are not repeated herein. In this embodiment, the distributed indoor positioning system 1 of the present disclosure can include an image temporary storage unit 15 and a map data building module 16.

The image temporary storage unit 15 can temporarily store the image stream generated by the image capturing module 12. The image capturing module 12 possibly captures a plurality of indoor images 200 continuously but the image dimensionality reduction module 13 does not start to execute the comparison process, so the image temporary storage unit 15 can temporarily store the image stream, and the image dimensionality reduction module 13 can fetch the required image stream for comparison process later. In an embodiment, the image temporary storage unit 15 can be a buffer register or a volatile memory.

According to above content, it can be understood that the indoor map data 100 is pre-built. In order to prevent a map data integration server 2 from having an excessive computing load when building the map data, the present disclosure proposes that the user device can first process the obtained image data for building the map data, and the image data processed by the user device can then be uploaded to the map data integration server 2. Under this mechanism, the present disclosure provides a distributed computing concept that each user device processes the obtained image data first, so as to effectively reduce the computing load of the map data integration server 2. The map data building module 16 can execute the operation of building the map data.

In a data building mode, the map data building module 16 can track the user's movement to define coordinate data. The map data building module 16 can link the coordinate data with the dimensionality-reduced image corresponding thereto, to generate personal positioning map data. Simply speaking, when the positioning process is not executed, the building mode of map data building can be executed and the map data building module 16 can start to continuously track the user's movement, and generate the coordinate data according to the user's movement. The coordinate data can also be called as a built coordinate. At the same time, the image capturing module 12 can capture the indoor image corresponding to the built coordinate data, and the dimensionality reduction processing can be performed on the captured indoor image. Finally, the map data building module 16 can pair and combine the coordinate data with the dimensionality-reduced image, so that it can determine which image matches which coordinate data. This map data is built by single user and also called as personal positioning map data. Therefore, after the user captures the indoor image, the coordinate data can be estimated, so as to obtain the indoor position corresponding to the capture indoor image.

In an embodiment, the personal positioning map data generated by the map data building module 16 can be uploaded to the map data integration server 2, and stored in a database 21 of the map data integration server 2. Furthermore, the map data integration server 2 can receive and integrate the personal positioning map data transmitted by at least one user, so that the personal positioning map data uploaded by multiple users can be integrated to generate the indoor map data 100.

In another embodiment, after the comparison module 14 determines the position of the user, the comparison module 14 can activate a navigation program or provide guide information. Specifically, the comparison module 14 can provide the positioning result to, for example, a service module (which is not shown in figures), and the service module can provide a service corresponding to the positioning result, for example, the service module can perform a guide program, or guide information corresponding to the position obtained by the positioning.

Figure 3:
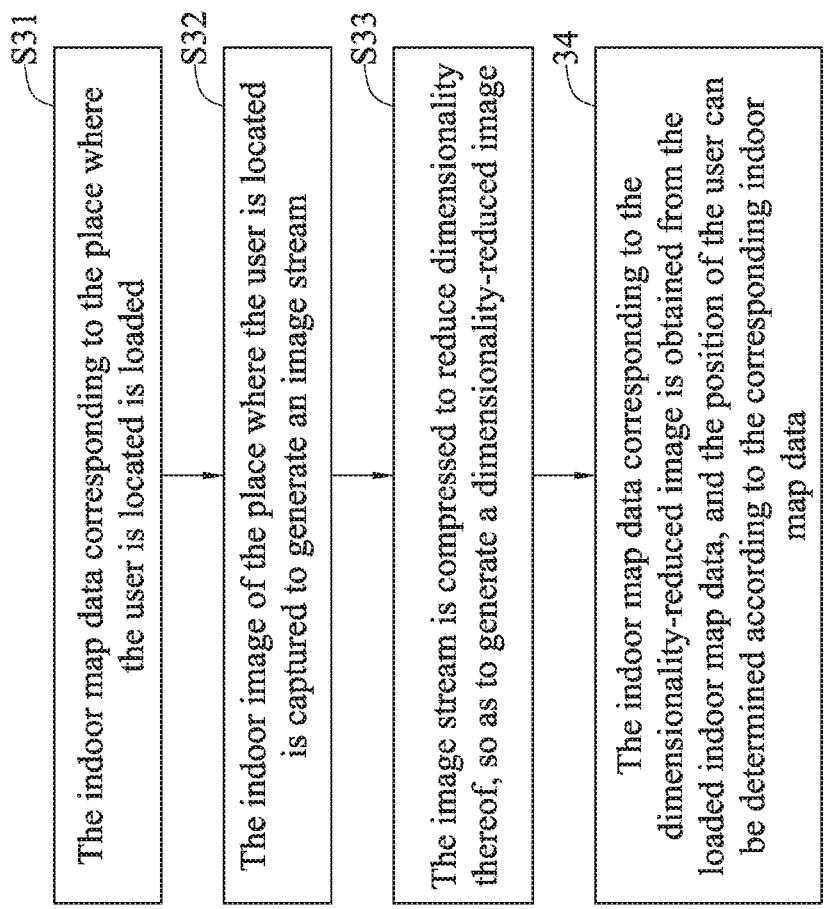
FIG. 3 is a flowchart of a distributed indoor positioning method of the present disclosure.

Please refer to FIG. 3, which is a flowchart of a distributed indoor positioning method of the present disclosure. As shown in FIG. 3, in step S31, the indoor map data corresponding to the place where the user is located is loaded. In order to determine the position of the user, the indoor map data corresponding to the place where the user is located must be obtained first in the process of the positioning determination, so as to determine the position of the user according to the indoor image corresponding to the place where the user is located.

In step S32, the indoor image of the place where the user is located is captured to generate an image stream. Specifically, a camera of the user device can be used to capture the indoor image of the place where the user is located, and the indoor image can be used as the basis for subsequent positioning determination. The indoor image is processed to generate an image stream, and the image stream is temporarily stored.

In step S33, the image stream is compressed to reduce dimensionality thereof, so as to generate a dimensionality-reduced image. As mentioned above, if the map data is not compressed, the problem of excessive size of the map data possibly occurs. Therefore, the dimensionality reduction processing is performed on the built indoor map data in advance. For the image comparison in next step, the dimensionality reduction processing is also performed on the image stream in this step.

In step S34, the indoor map data corresponding to the dimensionality-reduced image is obtained from the loaded indoor map data, and the position of the user can be determined according to the corresponding indoor map data. In this step, after receiving the dimensionality-reduced image stream, the indoor map data corresponding to the received dimensionality-reduced image stream can be obtained from the indoor map data loaded previously, to estimate the position of the user. In an operation of position estimation, the indoor position coordinates corresponding to the obtained indoor map data can be used to determine the position where the indoor image is captured.

In an embodiment, before executing the indoor positioning, the building mode can be executed. In the building mode, the user's movement is tracked to define the coordinate data, and the coordinate data is linked with the corresponding dimensionality-reduced image, so as to generate the personal positioning map data. Next, the personal positioning map data can be uploaded to the map data integration server.

Furthermore, the map data integration server can integrate the personal positioning map data transmitted by at least one user, to generate the indoor map data; in other words, the map data integration server can integrate personal positioning map data provided by multiple users, to generate the final indoor map data.

In another embodiment, after the user's position is determined, the distributed indoor positioning system can activate a navigation program or provide guide information. The positioning service is usually required for indoor navigation or guide information providing service. Therefore, the indoor positioning technology of the present disclosure can be used to determine the position of the user and provide the service corresponding to the position of the user.

Figure 4:
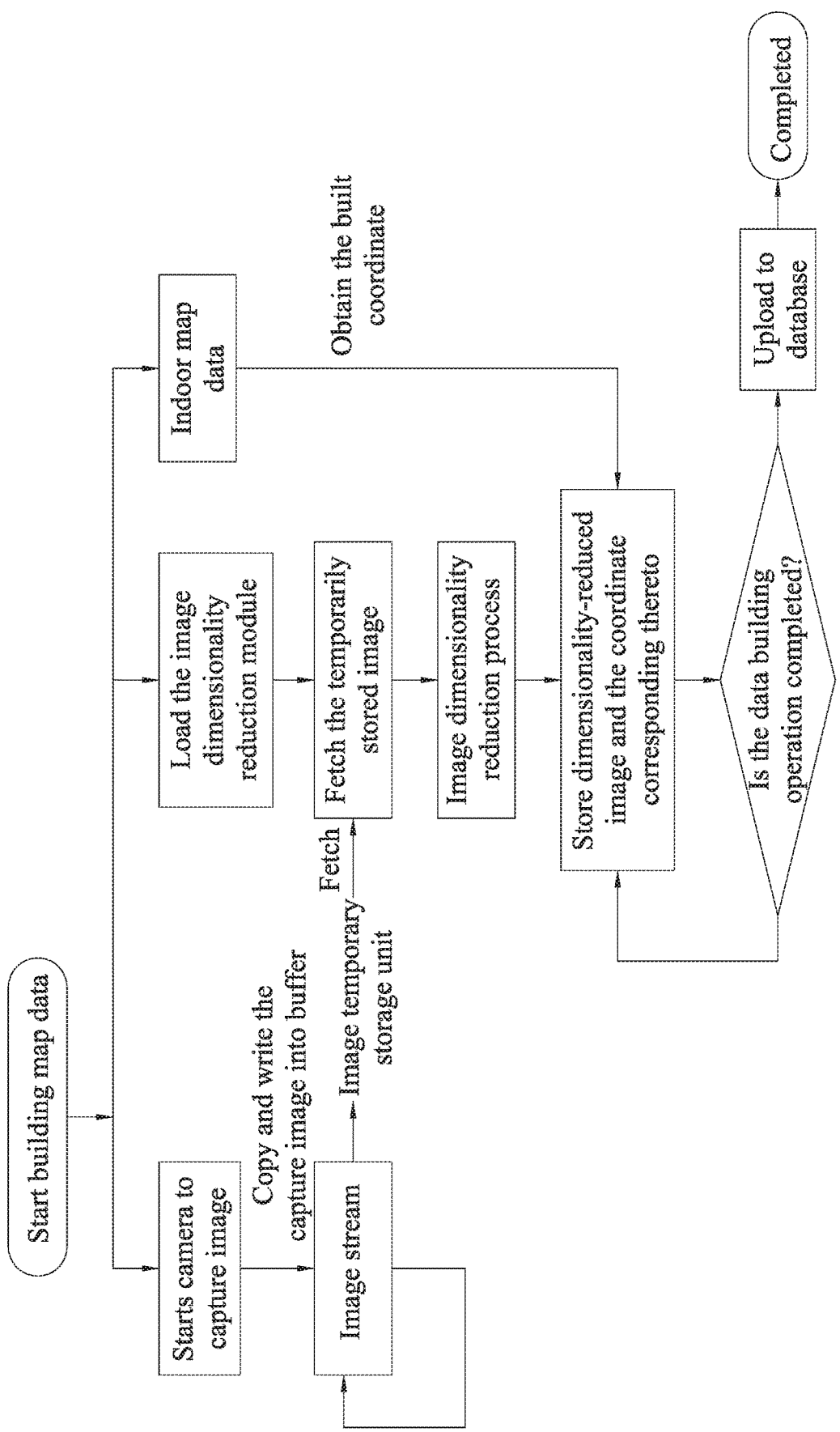
FIG. 4 is a flowchart showing the steps in an operation of the distributed indoor positioning system building map data before positioning determination according to the present disclosure.

Please refer to FIG. 4, which is a flowchart showing the steps in an operation of distributed indoor positioning system building the map data before the positioning determination process. As shown in FIG. 4, when the operation of building the map data starts, three steps can be executed simultaneously or sequentially. One of the three steps is to start the camera to shoot the indoor image and convert the indoor image into the image stream; at this time, the image stream can be temporarily stored in an image temporary storage buffer (which can be the image temporary storage unit shown in FIG. 2). When the builder (such as the user) is moving, the distributed indoor positioning system keeps tracking and recording the movement of the builder, to generate the built coordinates (which is the coordinate data).

After the image stream and the built coordinates are obtained, the distributed indoor positioning system starts the image dimensionality reduction module. The image dimensionality reduction module obtains the image stream from the image temporary storage buffer, and performs dimensionality reduction processing on the image, and then map the dimensionality-reduced image to the built coordinates, so as to complete the operation of building the map data. Next, it is determined whether the operation of building the map data continues, and when the operation of building the map data is determined to continue, the operation of mapping the dimensionality-reduced image to the built coordinate is executed, to generate the map data. When it is determined that the operation of building the map data does not continue, it indicated that the map data is built completely, so that the map data can be uploaded to the database of the map data integration server.

It should be noted that one or more user possibly uploads the map data for many times, so the map data integration server can also integrate the map data uploaded by multiple users to form the indoor map data for everyone to use.

Figure 5:
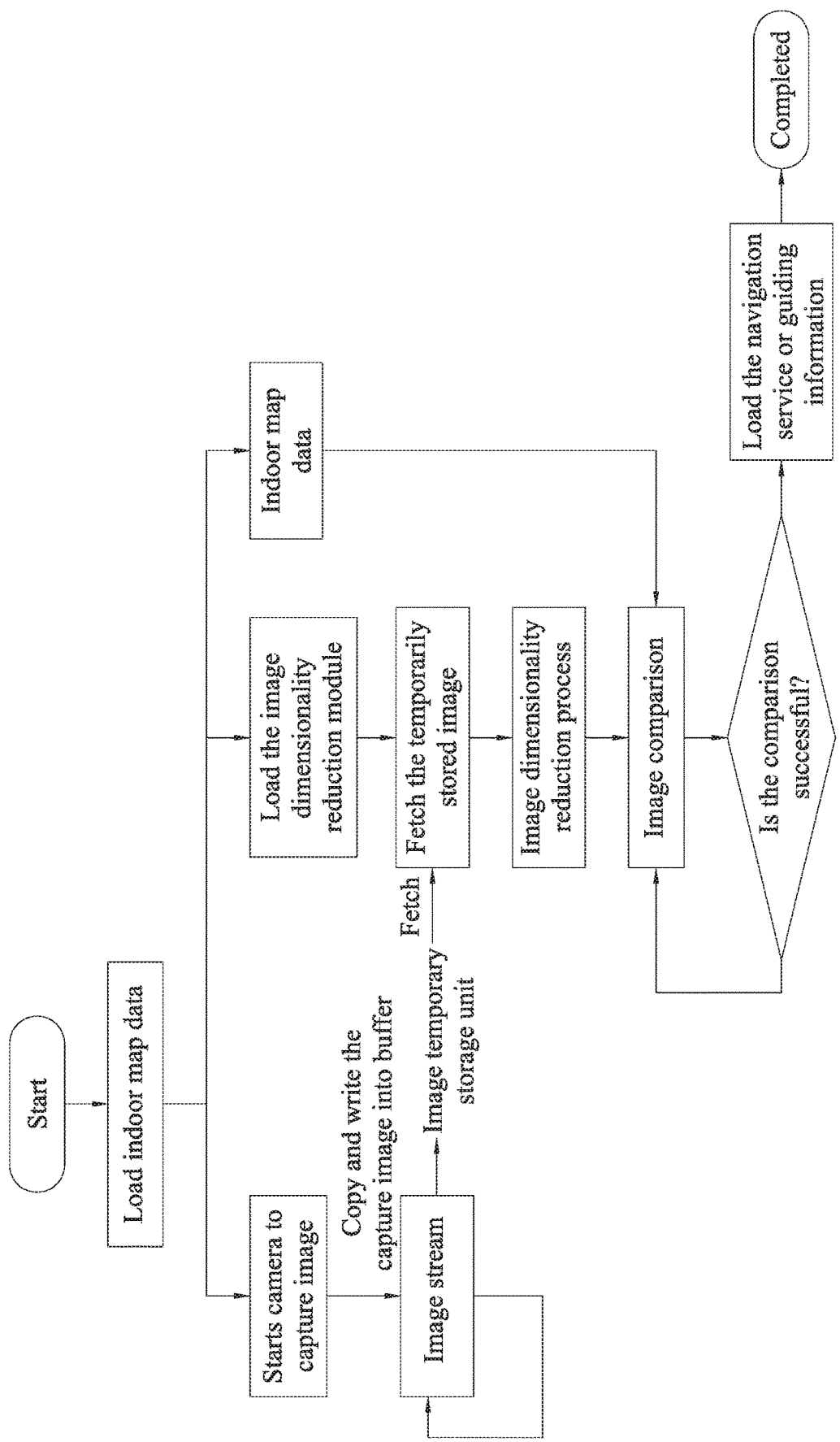
FIG. 5 is a flowchart showing the steps in an operation of the distributed indoor positioning system executing positioning determination according to the present disclosure.

Please refer to FIG. 5, which is a flowchart showing the steps of a distributed indoor positioning system executing positioning process, according to the present disclosure. As shown in FIG. 5, when the distributed indoor positioning system starts the positioning determination process, three steps can be executed simultaneously or sequentially, and one of the three steps is to start the camera to shoot the indoor image, convert the indoor image into the image stream, and temporarily store the image stream in the image temporary storage buffer (which can be the image temporary storage unit shown in FIG. 2). In order to determine the place where the user is located, the indoor map data related to the place where the user is located can be loaded. The indoor map data is pre-built, as shown in FIG. 4.

After the image stream and the indoor map data are obtained, the distributed indoor positioning system starts the image dimensionality reduction module. The image dimensionality reduction module performs dimensionality reduction on the image stream, and then compares dimensionality-reduced image with the indoor map data, and determine whether the comparison is successful. When the comparison is successful, the image dimensionality reduction module generates the positioning result, and the corresponding service, such as navigation service or guiding service, can be provided. When the comparison is not successful, it indicates that the position of the user is not determined, and the flow returns to the comparison step to perform comparison on other image stream or other indoor map data, thereby determining the position of the user.

According to above-mentioned contents, the distributed indoor positioning system and method of the present disclosure can perform dimensionality reduction processing on the loaded indoor map data and the image stream formed by the captured images, so that the file sizes of the map data and the indoor image can be reduced, and the computation of the distributed indoor positioning system for executing the positioning process can be reduced; furthermore, every user device can perform the dimensionality reduction processing on the indoor map data, so as to effectively reduce the computing load of the map data integration server.

The present disclosure disclosed herein has been described by means of specific embodiments. However, numerous modifications, variations and enhancements can be made thereto by those skilled in the art without departing from the spirit and scope of the disclosure set forth in the claims.

What is claimed is:

1. A distributed indoor positioning system, comprising:
a map data loading module configured to load indoor map data corresponding to a place where a user is located;
an image capturing module configured to capture, through a camera of a user device, an indoor image corresponding to the place where the user is located, and generate an image stream;
an image dimensionality reduction module configured to compress the image stream, reduce dimensionality of the image stream, and generate a dimensionality-reduced image; and
a comparison module configured to obtain, from the indoor map data in the map data loading module, corresponding indoor map data according to the dimensionality-reduced image, and determine a position of the user according to the corresponding indoor map data.

2. The distributed indoor positioning system according to claim 1, further comprising an image temporary storage unit configured to temporarily store the image stream.

3. The distributed indoor positioning system according to claim 1, further comprising a map data building module configured to execute a building mode to track movement of the user for defining coordinate data, link the coordinate data with the dimensionality-reduced image corresponding thereto, and generate personal positioning map data.

4. The distributed indoor positioning system according to claim 3, wherein the personal positioning map data generated by the map data building module is uploaded to a map data integration server, and stored in a database of the map data integration server.

5. The distributed indoor positioning system according to claim 4, wherein the map data integration server receives and integrates the personal positioning map data transmitted by at least one user to generate the corresponding indoor map data.

6. The distributed indoor positioning system according to claim 1, wherein the comparison module activates a navigation program or provides guide information after the position of the user is determined.

7. A distributed indoor positioning method, comprising:
loading indoor map data corresponding to a place where a user is located;
capturing an indoor image of the place where the user is located to generate an image stream;
compressing the image stream to reduce dimensionality of the image stream and generate a dimensionality-reduced image; and
obtaining, from the loaded indoor map data, corresponding indoor map data according to the dimensionality-reduced image, and determining a position of the user according to the corresponding indoor map data.

8. The distributed indoor positioning method according to claim 7, further comprising:
before determining the position of the user, executing a building mode to track movement of the user for defining coordinate data, link the coordinate data with the dimensionality-reduced image corresponding thereto, and generate and upload personal positioning map data to a map data integration server.

9. The distributed indoor positioning method according to claim 8, wherein the map data integration server integrates the personal positioning map data transmitted by at least one user to generate the corresponding indoor map data.

10. The distributed indoor positioning method according to claim 7, further comprising:
after the position of the user is determined, activating a navigation program or providing guide information.

* * * * *